United States Patent

[11] 3,622,764

[72] Inventors Horst Brendes
Walldorf;
Waltraud Bar, Bruchsal; Egon Funk,
Nussloch, all of Germany
[21] Appl. No. 64,783
[22] Filed Aug. 18, 1970
[45] Patented Nov. 23, 1971
[73] Assignee Teldix GmbH
Heidelberg, Germany
[32] Priority Aug. 23, 1969
[33] Germany
[31] P 19 43 026.3

[54] METHOD OF DETERMINING THE DRIFT OF A GYROCOMPASS
15 Claims, 5 Drawing Figs.

[52] U.S. Cl. .................................................... 235/151.3,
74/5, 33/226
[51] Int. Cl. ..................................................... G06g 7/78
[50] Field of Search........................................... 235/151.32,
151.3, 150.25, 150.26, 150.27; 74/5, 5.4; 33/226

[56] References Cited
UNITED STATES PATENTS
| | | | |
|---|---|---|---|
| 3,258,977 | 7/1966 | Hoffman ..................... | 74/5 X |
| 3,559,493 | 2/1971 | Brooks, Jr. et al. .......... | 74/5 X |
| 3,359,805 | 12/1967 | Schlitt ......................... | 74/5 X |
| 3,442,140 | 5/1969 | Pelteson ...................... | 235/150.25 X |
| 3,319,052 | 5/1967 | Arshal ......................... | 235/150.25 X |

*Primary Examiner*—Eugene G. Botz
*Assistant Examiner*—Edward J. Wise
*Attorney*—Spencer & Kaye

ABSTRACT: The drift of a directional gyro with a stationary gyro carrier is determined by making a plurality N of measurements of the alignment angle $\alpha$ of the gimbal bearing the gyro rotor with respect to a reference axis determined by the position of the gyro carrier at equal time intervals within a predetermined period of time, producing electrical value signals, preferably pulse sequences, proportional to the measured angular values, and adding the electrical signals to provide a sum which is a measure of the gyro drift. If the alignment angle $\alpha_0$ at the beginning of the measuring periot T is other than zero, the sum is modified to provide compensation for the initial alignment angle $\alpha_0$.

METHOD OF DETERMINING THE DRIFT OF A GYROCOMPASS

BACKGROUND OF THE INVENTION

The present invention relates to a method for determining the drift of a directional gyro with a stationary gyro carrier (e.g., a still-standing vehicle) by means of angular measurements.

The fact that directional gyros drift is well known. The drift of a directional gyro consists of two components, the drift dependent on the geographical latitude and the random drift inherent to each gyro. With a known location of use, the drift dependent on the geographical latitude can be compensated by certain known measures at the gyro. An advance compensation of the random drift, however, is not possible.

In order to provide compensation for the drift it is therefore necessary to determine the drift of the gyro at certain intervals (either only the random drift or the sum of the drifts for an uncompensated gyro) and to make an extrapolation for the following time period. For this purpose, the gyro carrier, e.g., the vehicle, must be standing still. At a given time interval the angle which the spin or major axis of the directional gyro forms with a reference direction is measured. The resulting angular difference represents the drift during the given time period. If a digital goniometer is available for measuring the angles, which permits resolution of the measured angular value to one angular unit ($1^{7E}$) where $6400^{7E} = 360°$, a measuring time of 3 minutes would result, for example, in an inaccuracy of the drift determination of $20^{7E}$ per hour. Such an inaccuracy in the drift determination is not tenable in many cases. It is therefore necessary to substantially lengthen the measuring time, i.e., to increase the time period for the angular measurement, for example, tenfold. Since the vehicle, however, must remain stationary during the drift determination, such a long measuring period is not practical. Moreover, with the above-mentioned method temporary movements of the gyro may falsify the measured drift value.

SUMMARY OF THE INVENTION

It is therefore the object of the present invention to provide a method for determining the drift of a gyro which, with the same resolution capability in the goniometer device utilized, e.g., $1^{7E}$, furnishes a greater resolution of the angular value in a shorter measuring period.

It is a further object of the invention to provide a method for determining the drift of a gyro wherein temporary movements of the gyro will not result in a falsification or error in the measuring result or at least will cause only a slight falsification.

This is accomplished, according to the present invention, in that during a given measuring period T a plurality N of measurements of the alignment angle $\alpha$ of the gimbal bearing the gyro rotor with respect to a reference direction given by the position of the gyro carrier are made at identical time intervals, electrical values are produced which are proportional to these measuring results, these electrical values are algebraically added together to provide a sum representing a measure of the drift which may be further processed. If the angle $\alpha_0$ between the gimbal and the reference direction at the beginning of the measuring period is other than zero, this angle $\alpha_0$ must be considered in the measurements and the above-mentioned sum modified accordingly. Preferably the values proportional to the goniometer results are pulse sequences, with the number of pulses in each sequence being proportional to the respective measured value.

In order to determine the drift, the reference direction can be brought into coincidence with the alignment of the gimbal (e.g., with the spin axis of the gyro rotor) at the beginning of the measuring period. In this case, the angle $\alpha_0$ equals 0 and it is sufficient to add the pulses of the N pulse sequences obtained during the measuring period in the conventional manner. This addition can be made in an electronic counter. This alignment can however be avoided, but in such case as mentioned above the size of the starting angle $\alpha_0$ must be taken into consideration. This can easily be accomplished, for example, by measuring the angle $\alpha_0$ and subtracting or deducting an electrical value corresponding to $N\alpha_0$ from the sum obtained as the measuring result. However, according to a further feature of the invention it is more favorable, in the event the angle $\alpha_0$ is other than zero, to add the pulses of the individual pulse sequences in the first half of the measuring period T to provide a sum, and to to add the pulses of the individual pulse sequences in the second half of the measuring period T to this sum with the opposite sign, i.e., subtract, so as to form a final sum equal to the difference between the respective sums of the pulses occurring during the two halves of the total measuring period T. This operation may be performed by a conventional adding-subtracting arrangement, e.g., as known in the digital processing art, or by means of a forward-backward counter which is controlled to count backward, for example, during the first half of the measuring period T and forward during the second half.

According to another feature of the invention, the numerical electrical values are passed through an error-value filter prior to the addition in order to eliminate erroneous measurements produced, e.g., by interferences.

According to still a further feature of the invention whenever it is determined that the angle $\alpha$ to be measured is within a predetermined range on either side of the $0°/360°$ angle line, so that during the measuring period successive measurements may pass over this line and produce erroneous results, the electrical values corresponding to the measured angles are modified by an amount corresponding to $180°$.

DESCRIPTION OF THE PREFERRED EMBODIMENTS

Figure 1:
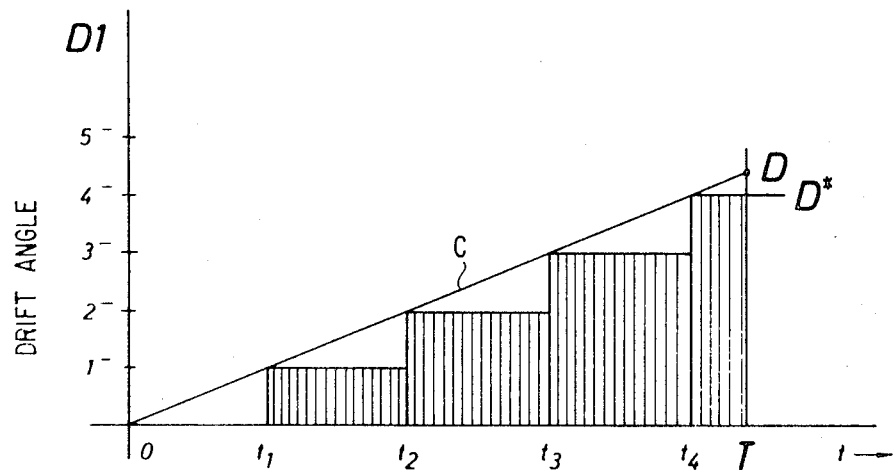
FIG. 1 is a graph of gyro drift versus time illustrating the operation of the method according to the invention for an initial alignment angle $\alpha_0$ equal to zero.
Figure 2:
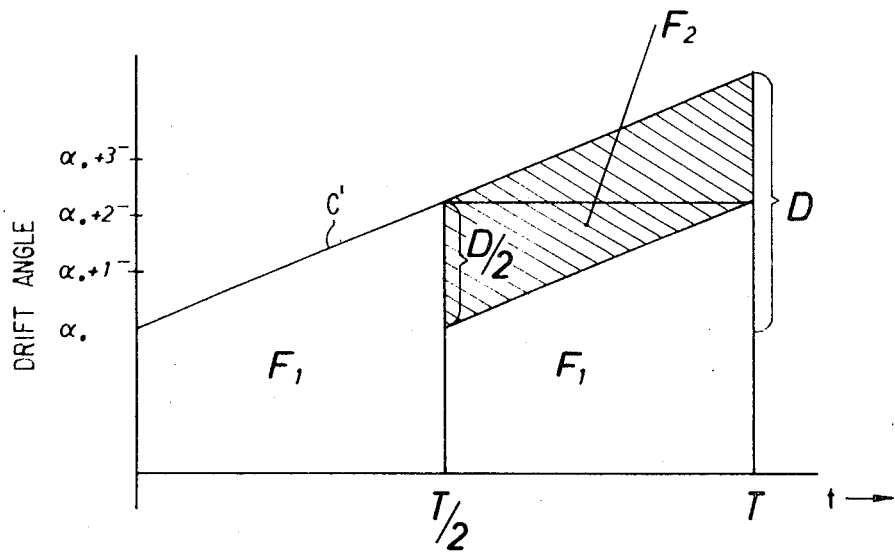
FIG. 2 is a graph of gyro drift versus time illustrating the method according to the invention for an initial alignment angle $\alpha_0$ which is other than zero.

With the aid of FIGS. 1 and 2 it will be shown that the measured value produced by the method of the present invention represents a parameter or measure of the drift of the gyrocompass. FIGS. 1 and 2 differ from each other in that in the one case (FIG. 1) the initial or starting angle $\alpha_0$ at the beginning of the measuring period T equals zero, while in the other case (FIG. 2) it does not equal zero. In both figures it is assumed that the resolution of the goniometer is $1^{7E}$, and that there is a linear drift course C or C'.

As indicated above according to the method of the invention, a plurality N of angular measurements are taken at fixed intervals within a fixed predetermined time period T. The graph of FIG. 1 shows that during the plurality of the measurements taken up to time $t_1$ at equal time intervals, the angular value of the drift registered is 0. Between time $t_1$ and $t_2$ the same number of measurements results in the angular value $1^{7E}$ and thereafter between $t_2$ and $t_3$ the angular value $2^{7E}$ results, etc. Between $t_4$ and the end of the measuring period T the angular value $4^{7E}$ is registered for a lesser number of measurements. Since all of the measurements are made at equal time intervals, the sum of the pulses obtained in measuring intervals $t_1-t_2, t_2-t_3.....t_4-T$ is proportional to the shaded areas associated with the measuring intervals.

The calculation of the sum F of these shaded areas results in (generally expressed):

$$F = T \cdot \left(n - \frac{n(n+1)}{2D}\right)$$

where $n$ is the number of shaded areas and $D$ the accumulated drift value at the end of the measuring period $T$. Since the increases in height in the shaded areas are $1^{'7E'}$ each, $n$ can be replaced by the value for $D^*$, and finally $D^*=D$, if a drift error of $1-2^{'7E'}$/hour is permissible; resulting in a completed error consideration.

The exact triangular area of the triangle shown in FIG. 1 is $$F_{exact}=TD/2.$$

Since $T$ is a fixed value, the triangular area is proportional to the drift $D$ to be measured. The difference between the exact triangular surface area and the approximate triangular surface area is $$F_{exact}-F=T/2,$$

a value which is independent of the drift $D$ and hence can be considered in the derivation of the desired measuring value. The sum of the pulses added during the measuring period $T$ thus represents a measure for the area of the triangle and thus for the drift $D$ occurring during the measuring period. Due to the summation of the pulses of the plurality of measurements, the drift value obtained in the measuring period can be read out with a higher resolution than $1^{'7E'}$. Additionally, temporary movements of the gyrocompass will be substantially averaged out with the method of the present invention.

In FIG. 2 it is assumed as shown that the angle at the beginning of the measuring period $\alpha_0 \neq 0$. In view of the relationships between period $T$ and the course $C'$ of the drift, the drift value $D$ during the measuring period $T$ can be obtained if the area $F_2$ of the shaded parallelogram, or a value corresponding to one-half of that area is formed. The area $F_2$ of the parallelogram is equal to the total area $F_{total}$ of the illustrated trapezium minus twice the area $F_1$, i.e.:

$$F_2=F_{total}-2F_1=TD/4$$

or $$D=4/T\cdot F_2.$$

By determining a value proportional to the area of the parallelogram one obtains a parameter or measure of the drift $D$. A value proportional to the area of the parallelogram can be obtained, for example, in that, as previously mentioned, the number of pulses corresponding to the individual measured angular values $\alpha$ are algebraically added together with a first sign, preferably a negative sign, so that a sum or subtotal value is produced which is proportional to area $F_1$, and then the pulses generated during the second half of the measuring period, whose sum corresponds to the sum of areas $F_1+F_2$, are added with the opposite sign, i.e., a positive sign, to this first negative sum value. By adjusting the number of measurements per unit time, the measuring period $T$ itself and the frequency of the pulse sequences in the pulse trains it is possible to obtain the measured drift value, for example, directly in the angular unit mil ($'^{7E'}$), and to determine the resolution. It has been found that with the method according to the present invention measuring periods of up to a few minutes (e.g., 3) are sufficient for determining the drift value $D$. In a practical embodiment, the pulse sequence frequency was 3.84 MHz., the number of measurements per unit time was 600. The shortest measuring period with a resolution of $1^{'7E'}$ for the goniometer is then 12.8 seconds. The measuring period, however, should be increased by the factor $2^n$ to favorably increase the resolution. Because of the addition and subtraction of the pulses utilized in this embodiment of the invention, the difference value $F_{exact}-F=T/2$ mentioned above when discussing the situation where $\alpha_0$ equals zero need no longer be considered.

Since it is possible that interference in the circuitry or in the gyro produces individual erroneous measurements, the present invention further provides for the detection and elimination of such erroneous measurements through the use of error-value filtering techniques. According to this feature of the invention, instead of the measured value determined to be erroneous being added to the previously added values, the erroneous value is disregarded and the measuring value obtained from the preceding measurement is again entered into the measuring result. This is based on the consideration that the individual measuring values cannot change suddenly by more than $1^{'7E'}$ which is the resolution of the goniometer. Details about the possibilities of construction of such an error-value filter will become apparent from FIG. 3 which shows the principles of a circuit arrangement for carrying out the method of the present invention.

Figure 3:
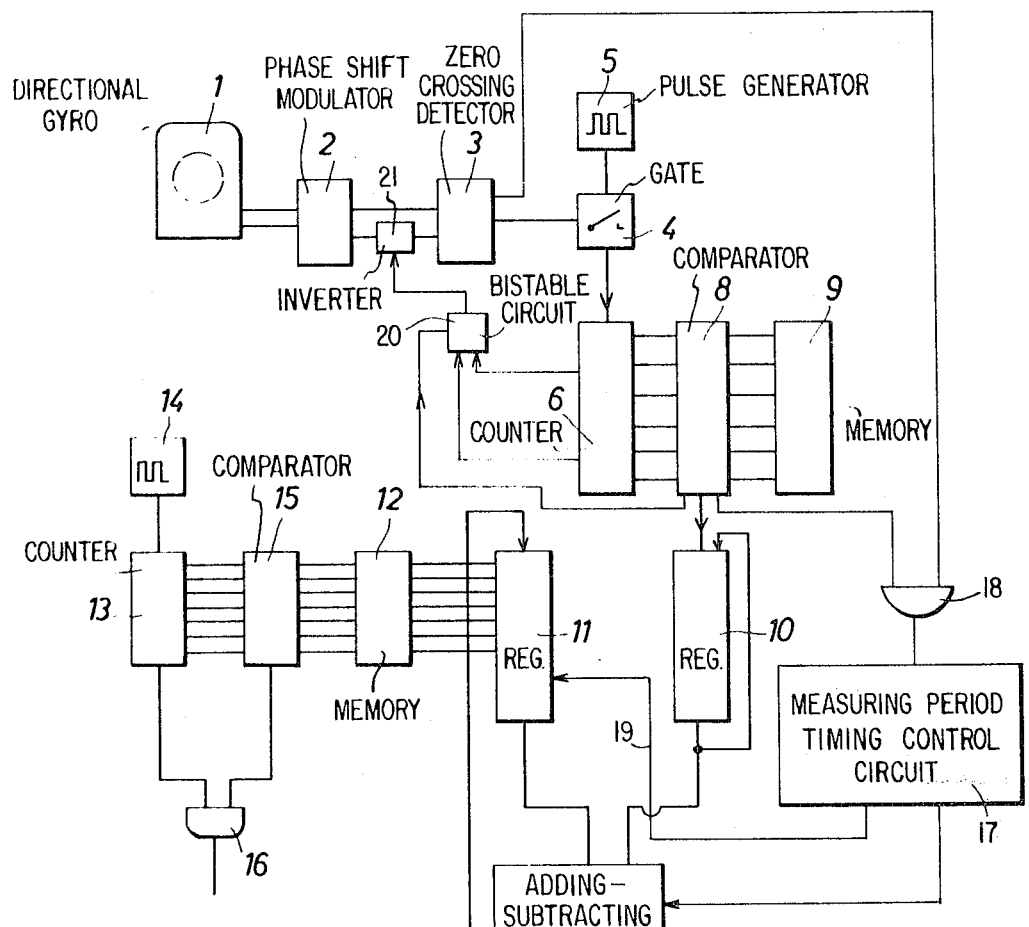
FIG. 3 is a schematic block diagram illustrating an apparatus for carrying out the method according to one embodiment of the invention.

Referring now to FIG. 3 there is shown a directional gyro 1 which is mounted on a vehicle, and which contains a goniometer in its housing for producing an output signal dependent on the position of the vehicle with respect to the alignment of the gyro gimbal. For example, such a goniometer may emit two voltages whose amplitudes correspond to the sine and cosine of the angle between the spin axis of the gyro and the longitudinal axis of the vehicle. The two output voltages from the goniometer are fed to a phase modulator circuit 2 which generates two further voltages from the first two voltages which correspond in their phase shift with respect to each other to the measured momentary angle $\alpha$. The two voltage signals from the circuit 2 are in turn fed to a zero crossing detector 3 which produces, e.g., at the negative zero passages, start-stop signals for a gate 4 from these two voltages. The gate 4 permits pulses from a pulse generator 5 to be fed to an electric counter 6 for a period of time corresponding to the phase shifts between the two output voltages of circuit 2. With an operating frequency of 600 Hz. for the voltage applied to the goniometer, the counter 6 is offered 600 pulse sequences per second. According to the method of the present invention the pulses of these pulse sequences are added and, if angle $\alpha_0$ is other than zero then the value of $\alpha_0$ must be taken into consideration.

Various techniques are available to provide compensation for the angle $\alpha_0$ when it is other than zero. According to the preferred embodiment of the method, the individual pulses of the pulse sequences are added during the first half of the period T and then algebraically added with the opposite sign, i.e., subtracted, during the second half of the measuring period T. In the embodiment of FIG. 3, the desired summation operation is performed by means of an arrangement including an adding-subtracting circuit 7 and a register 11 whose operation will be more fully explained below.

However, in order to be able to detect error values produced by interferences, and to eliminate such values from the drift determination an error-value filter is connected ahead of the adding and subtracting mechanism 7 which error-value filter consists of a comparison circuit 8, a memory 9 and a register 10. After each new determination of the angle $\alpha$ in counter 6, the comparison circuit 8 compares the binary value in counter 6 corresponding to this angle with the binary value stored in memory 9, which corresponds to the immediately preceding angle measurement. After the comparison, circuit 8 causes the new binary value in counter 6 to be transferred into memory 9. If, as a result of the comparison, the two binary values are determined to be equivalent, this value is transferred to register 10 whose previously stored value is erased. The binary value newly stored in register 10 is now fed, together with the binary value stored in register 11, and representing the subtotal, to the adding and subtracting circuit 7 which is controlled by the measuring period timing circuitry 17 to add the fed-in values to a negative number during the first half of the measuring period and to add the values fed in during the second half of the measuring period to this negative number with a positive sign. The result of this addition or subtraction is again fed into register 11. The binary value from register 10 fed into adding and subtracting circuit 7 is immediately newly stored therein. This is necessary in order to have available a value which can be added or subtracted to the subtotal of register 11 when the binary values of counter 6 and memory 9 are not identical, in which case no new value is fed to register 10. Thus, this error-value filter prevents error values from being considered in the measuring result.

After the measuring period T a binary number corresponding to the drift D to be determined is present in register 11. A digital number corresponding to the required resolution of the drift value is stored in memory 12 after termination of the measuring period by shifting the contents of register 11 into memory 12. If this binary value is to be converted into a pulse width, an electronic counter 13 may be provided to which pulses (e.g., at a 200 Hz. pulse sequence frequency) from pulse generator 14 are fed, and another comparison circuit 15 provided between the memory 12 and the counter 13. The output pulse of counter 13 occurring when counter 13 changes from its final value to its starting position is utilized to enable a gate 16. The comparison member 15 continuously compares the momentary numerical value of counter 13 with the value stored in memory 12, and at coincidence emits a pulse which again blocks gate 16. The duration of the output pulse of gate 16 is then a measure for the drift of the gyro. This value can be used to compensate the drift of the gyro or it can be used for a corrective calculation of the indicated angle $\alpha$.

If the pulses of the first half of the measuring period are only added and the resulting sum is subtracted from the pulses of the second half of the measuring period, the pulse from counter 13 must block gate 16 and the pulse from comparison circuit 15 must enable the gate.

Due to the manner of operation of the error-value filter, a digital value corresponding to angle $\alpha_0$ must be written into register 10 at the beginning of the measuring period. This value is also written in only upon equivalence of two consecutive measuring values.

When at the beginning of the measurement the second equivalence in the comparison circuit 8 occurs, the comparison circuit 8 opens the gate 18 for the starting pulses of detector 3. These pulses are fed to time control circuit 17, which with the first pulse starts the measuring period T by activating the adding-subtracting circuit 7. When the sum of starting impulses fed in the timing control circuit 17 is equal to half the sum of measurements within the time T, a second signal is fed from circuit 17 to circuit 7 which causes that the incoming values are now added with the opposite sign. At the end of the measuring period T the circuit 7 is stopped and register 11 is caused to shift its content into memory 12 (line 19).

When the angle $\alpha$ to be measured is near 0° or near 360°, the 0°/360° line will likely be passed during the measuring period T. Since the number of pulses is very small near 0° and very large near 360°, such a passage of the 0°/360° line during the measuring period would effect a completely erroneous drift measurement. According to a further feature of the present invention care is therefore taken before each measuring period, that such a passage over the 0°/360° line will not occur. For this purpose, angle $\alpha_0$ is determined before each measuring period T and when the number of pulses falls below or above a given limit value, the enabling time of gate 4 is extended or shortened, respectively, by a value corresponding to 180°. This is accomplished by negating a voltage applied to member 3. Angle $\alpha_0$ is here artificially changed, which, however, has no influence on the measuring result because $\alpha_0$ is eliminated anyhow.

This must be done before the measuring period T begins. Therefore the first equivalence in the comparison circuit 8 prepares a bistable circuit 20, which is fed with pulses from counter 6. The state of this bistable circuit 20 is changed when the counter 6 reaches a first given threshold and changes again when the counter reaches also a second given threshold. Therefore at angles near 0° and near 360° the bistable circuit 20 is in the same stable state, in which it causes one of the output voltages of circuit 2 to be negated by means of an inverter 21.

In order to be able to register the sum of the pulses up to the end of the first half of the measuring period T, register 11 must be provided with a plurality of binary locations. According to a further feature of the present invention, this register may be limited to a number of binary locations which is just capable of registering the maximum drift value to be expected. Because of the subtraction during the one half of the measuring period and addition during the other half the limitation will have no adverse effect, as becomes apparent from the following expression:

$$-\left(\sum_{0}^{T/2} M_X - nX\right) + \left(\sum_{T/2}^{T} M_X - nX\right) \simeq D$$

where $M_x$ are the measured values and $X$ is a numerical value at which the register 11 registers a 0 instead of a numerical value. The number $X+1$ then effects the registration of a 1 in the register, etc. The number $n$ indicates how many times $X$ is contained in the two sums of measured values. After the first half of the measuring period the sum of the measured values minus $nX$ is registered in the register. Since $X$ is also reached $n$ times during the second half of the measuring period, the values $nX$ are cancelled out of the formula. A prerequisite here for a correct indication is that the two sums of measuring values differ by an amount which is less than $X$.

Figure 4:
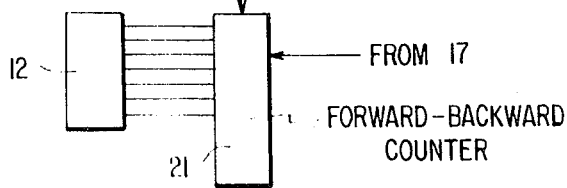
FIG. 4 is a schematic block diagram of a portion of the apparatus of FIG. 3 illustrating a further embodiment of the invention.

As indicated above various other techniques for carrying out the summation operation are available. According to another embodiment of the invention, as shown in FIG. 4, the adding-subtracting circuit 7 and register 11 of FIG. 3 may be replaced by a forward-backward counter 21. The counter 18 is controlled by the period timing control circuit 17 so that it counts in one direction, preferably the backward direction, during the first half of the measuring period, and in the other direction during the second half of the measuring period.

When the error value filter is also provided and therefore also register 10 it is additionally necessary to shift the content of register 10 to a counter 22 and to feed to this counter pulses from a pulse generator 23. By these means a pulse sequence is produced corresponding to the content of register 10 and this sequence is fed to the forward-backward counter 21.

According to still a further embodiment of the invention, in the event the initial alignment angle $\alpha_0$ is other than zero, this initial angle can be compensated for by modifying the sum of the measured values by subtracting a value equal to $N\alpha_0$.

Figure 5:
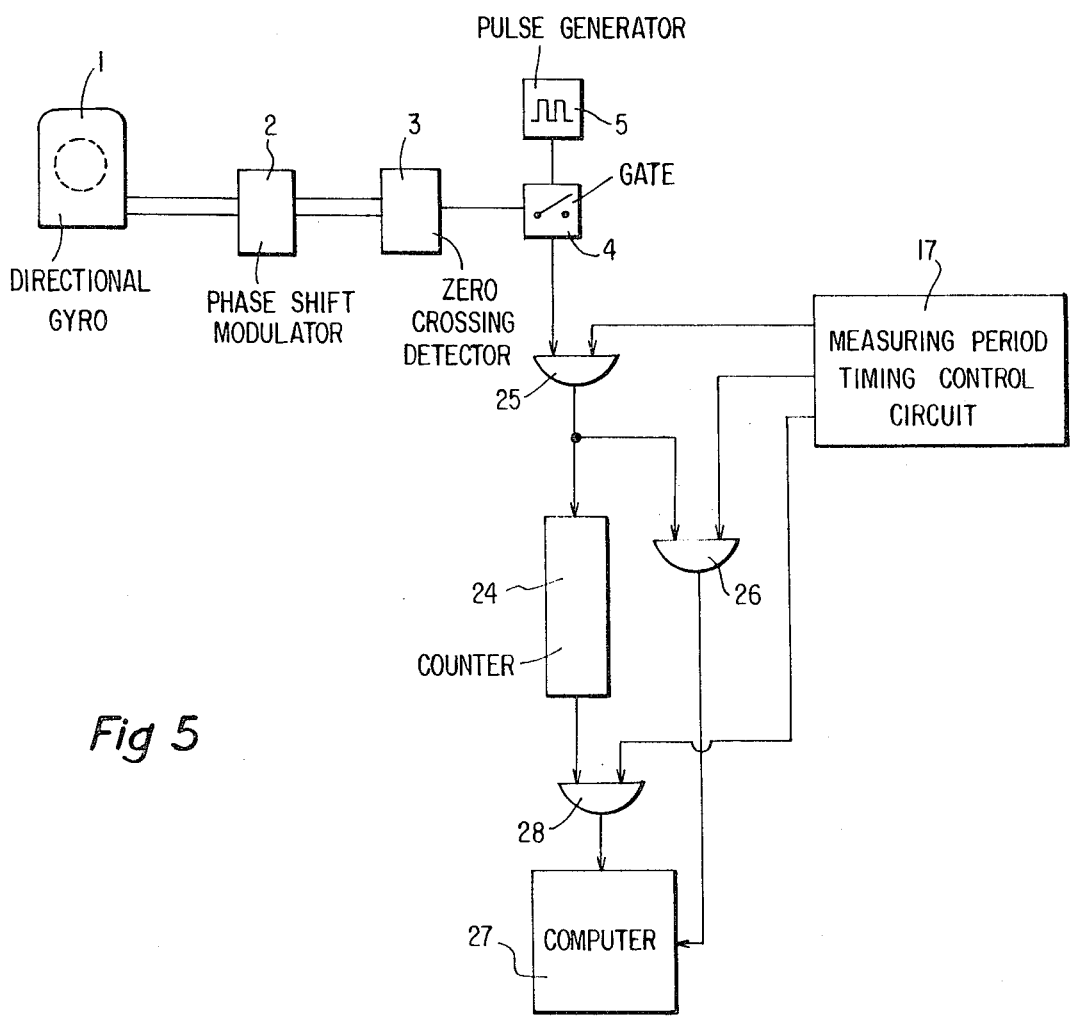
FIG. 5 is a schematic block diagram illustrating a further embodiment of the invention.

A corresponding embodiment is shown in FIG. 5. In this embodiment the output pulses of gate 4 are fed to a counter 24, when the gate 25 is open. The gate 25 is open during the period T, controlled by timing control circuit 17. The circuit 17 opens also gate 26 feeding the first pulse sequence within the period T which is proportional to $\alpha_0$ to the computer 27. In the computer 27 $N\alpha_0$ is formed and this value is subtracted from the value, which at the end of the period T is fed from counter 24 to the computer 27. Therefore the gate 28 is opened at the end of the period T.

It will be understood that the above description of the present invention is susceptible to various modifications, changes and adaptations and the same are intended to be comprehended within the meaning and range of equivalents of the appended claims.

We claim:

1. A method of determining the drift of a directional gyro with a stationary gyro carrier by means of angular measurements comprising, in combination:

within a predetermined period of time T, taking a plurality N of measurements of the alignment angle $\alpha$ of the gimbal bearing the gyro rotor with respect to a reference axis given by the position of the gyro carrier at equal time intervals;

producing electrical values proportional to these measured values;

algebraically adding these electrical values to provide a sum thereof which represents a measure of the drift of the gyrocompass; and modifying said sum to provide compensation for the initial alignment angle $\alpha_0$ in the event said angle $\alpha_0$ is other than zero at the beginning of the measuring period T.

2. The method as defined in claim 1 wherein the electrical values proportional to the measured values of the angle $\alpha$ are generated as pulse sequences having a number of pulses which is proportional to the measured values.

3. The method as defined in claim 2 wherein, when the angle $\alpha_0$ is other than zero at the beginning of the measuring period, the sum of the electrical values is modified by deducting an electrical value equal to $N\alpha_0$.

4. The method as defined in claim 2 wherein when the angle $\alpha_0$ is other than zero at the beginning of the measuring period T, the sum of the electrical values is modified by adding the pulses corresponding to the measured values during the second half of the measuring period T to the sum of the pulses produced during the first half of the measuring period with the opposite sign so as to form a sum equal to the difference between the respective sums of the pulses produced during the first and second halves of the measuring period T.

5. The method as defined in claim 4 wherein said modification of the sum of said pulses is provided by adding said pulses in a forward-backward counter which is controlled to count in one direction during the first half of the measuring period T and in the other direction during the second half of the measuring period T.

6. The method as defined in claim 2 wherein the number of measurements per unit time, the measuring period T and the frequency of the pulse sequences of the generator producing said electrical pulses are so tuned to one another that the desired resolution in portions of angular degrees or other units of counting is produced.

7. The method as defined in claim 2 including the additional step of filtering said electrical value signals prior to the summation thereof to eliminate erroneous or error signals.

8. The method as defined in claim 7 wherein said filtering step comprises:
  storing the number of pulses within each pulse sequence in a first counter;
  comparing the numerical value of the pulses stored in the first counter with the numerical value of the preceding measurement stored in a memory;
  providing a numerical value signal corresponding to that in said first counter for summation purposes when equivalence between the two compared numerical values results; and
  providing a numerical value corresponding to the last previous equivalence comparison for summation purposes when no equivalence between the two compared numerical values results.

9. The method as defined in claim 8 wherein the numerical value signals resulting from the comparison of the signals in the first and second counters are provided by:
  entering the numerical value signal stored in the first counter into a first register, for subsequent transmittal to an adding mechanism, whenever the comparison of the contents of the first counter and the memory indicates equivalence; and
  retaining a numerical value in the first register equal to that last entered therein when the comparison of the contents of the first counter and the memory indicates no equivalence.

10. The method as defined in claim 9 wherein the numerical value signals proportional to the measured values are added by sequentially transferring the contents of the first register to an adding arrangement, including a second register, which adds the numerical values to provide a sum of the electrical values in the second register; and
  wherein, when the angle $\alpha_0$ is other than zero at the beginning of the measuring period T, the sum of the electrical values is modified by controlling the adding arrangement to add the pulses corresponding to the measured values during the second half of the measuring period T to the sum of the pulses produced during the first half of the measuring period with the opposite sign so as to form a sum equal to the difference between the respective sums of the pulses produced during the first and second halves of the measuring period T.

11. The method as defined in claim 10 wherein said step of algebraically adding the electrical values to provide a sum includes the steps of (1) transferring the numerical values stored in said first and second registers to an adder, (2) transferring the numerical value corresponding to the resultant sum to the second register, and (3) repeating steps (1) and (2) until all of the N numerical values have been added together.

12. The method as defined in claim 10 wherein said second register is a forward-backward counter, and wherein said step of algebraically adding the electrical values to provide a sum includes sequentially transferring the numerical values stored in said first register to said second register until all of the N numerical values have been added together.

13. The method as defined in claim 10 including the further steps of:
  transferring the numerical value corresponding to the sum present in the second register at the end of the measuring period T to a further memory;
  comparing the numerical content of said further memory with the numerical content of a counter which is continuously counting a train of input pulses to provide a first output signal when equivalence occurs between the momentary numerical value in the counter and the numerical value stored in the further memory;
  providing a second output signal when the counter changes from its highest count position to its lowest count position; and
  utilizing said first and second output signals to enable and block a gate whereby the pulse width determined by opening and closing of the gate is a measure of the drift of the directional gyro.

14. The method as defined in claim 2 including the additional steps of:
  prior to the beginning of the measuring period T, determining whether the drift angle $\alpha$ to be measured lies in the vicinity of the 0°/360° angular direction; and
  changing the length of the pulse sequences corresponding to the measured angular values by an amount corresponding to 180° if the angle to be measured lies within a predetermined range on either side of the 0°/360° line.

15. The method as defined in claim 9 including the steps of:
  prior to the beginning of the measuring period T, measuring the momentary angle $\alpha$ at least twice in succession until equivalence between two successive measured numerical values is determined, and transferring the measured value at equivalence to the first register.

* * * * *